(12) United States Patent
Roberts et al.

(10) Patent No.: US 6,230,192 B1
(45) Date of Patent: May 8, 2001

(54) METHOD AND SYSTEM FOR ACCESSING REMOTE DATA BASED ON PLAYBACK OF RECORDINGS

(75) Inventors: Dale Tyson Roberts, Sausalito; Ann E. Greenberg, San Anselmo, both of CA (US)

(73) Assignee: CDDB, Inc., Indianapolis, IN (US)

( * ) Notice: Subject to any disclaimer, the term of this patent is extended or adjusted under 35 U.S.C. 154(b) by 0 days.

(21) Appl. No.: 09/354,166

(22) Filed: Jul. 16, 1999

Related U.S. Application Data

(62) Division of application No. 09/060,876, filed on Apr. 15, 1998, and a division of application No. 08/838,082, filed on Apr. 15, 1997, now Pat. No. 5,987,525.

(51) Int. Cl.[7] .................................................. G06F 13/00
(52) U.S. Cl. ........................ 709/217; 709/219; 709/313; 709/328
(58) Field of Search ..................................... 709/201, 202, 709/203, 204, 205, 213, 216, 217, 218, 219, 231, 313, 328; 705/26, 27; 707/10, 104, 501

(56) References Cited

U.S. PATENT DOCUMENTS

| | | | |
|---|---|---|---|
| 5,584,025 | * 12/1996 | Keithley et al. | 707/104 |
| 5,721,827 | 2/1998 | Logan et al. | 709/217 |
| 5,751,956 | * 5/1998 | Kirsch | 709/203 |
| 5,774,664 | 6/1998 | Hidary et al. | 709/218 |
| 5,774,666 | * 6/1998 | Portuesi | 709/218 |
| 5,778,181 | 7/1998 | Hidary et al. | 709/218 |
| 5,778,187 | 7/1998 | Monteiro et al. | 709/231 |
| 5,782,692 | * 7/1998 | Stelovsky | 463/1 |
| 5,796,393 | 8/1998 | McNaughton et al. | 345/329 |
| 5,796,952 | 8/1998 | Davis et al. | 709/224 |
| 5,809,250 | 9/1998 | Kisor | 709/227 |
| 5,809,512 | 9/1998 | Kato | 707/502 |
| 5,953,005 | * 9/1999 | Liu | 345/302 |

FOREIGN PATENT DOCUMENTS

| | | |
|---|---|---|
| 194 143 | 9/1986 | (EP) . |
| WO97/05616 | 2/1997 | (WO) . |

OTHER PUBLICATIONS

M. Mascha et al. "Interactive education: Transistioning CD–ROMs to the Web" Computer Network and ISDN Systems, vol. 27, No. 2, Nov. 1994, pp. 267–272.

International Search Report for PCT/US 98/07660 mailed Nov. 26, 1998.

* cited by examiner

Primary Examiner—Viet D. Vu
(74) Attorney, Agent, or Firm—Staas & Halsey LLP

(57) ABSTRACT

Entertainment content complementary to a musical recording is delivered to a user's computer by means of a computer network link. The user employs a browser to access the computer network. A plug-in for the browser is able to control an audio CD or other device for playing the musical recording. A script stored on the remote computer accessed over the network is downloaded. The script synchronizes the delivery of the complementary entertainment content with the play of the musical recording.

79 Claims, 3 Drawing Sheets

METHOD AND SYSTEM FOR ACCESSING REMOTE DATA BASED ON PLAYBACK OF RECORDINGS

CROSS-REFERENCE TO RELATED APPLICATIONS

This is a divisional of U.S. patent application Ser. No. 08/838,082 filed Apr. 15, 1997, now U.S. Pat. No. 5,987,525 and Ser. No. 09/060,876 filed Apr. 15, 1998 hereby incorporated by reference.

BACKGROUND

1. Field of the Invention

This invention pertains to the field of computer networking, and more particularly to the use of network protocols to provide services to users which are related to audio recordings.

2. Related Art

Over the past few years, on-line services have experienced explosive growth and have become a major new form of entertainment. Alongside this new entertainment, more traditional forms such as musical recordings have continued to be consumed on a massive scale.

The traditional experience of the musical recording is listening by a small group of persons gathered together in a room. The music fills the room acoustically, but there is little associated visual content, and there is only a limited interaction with the recording, consisting essentially of deciding which tracks to play and performing simple transformations on the recorded sound, such as setting the volume or applying an audio equalizer. This traditional experience dates back to the early age of 78 r.p.m. musical recordings almost a century ago.

The traditional production of a musical recording complements the traditional experience of the recording. The recording is produced in a number of recording sessions, subject to careful mixing and editing, and then released to the public. At that point, the recording is in a fixed form, nowadays an audio CD, whose purpose is to record as faithfully as possible the final sonic experience designed by its authors, the musicians, producer, and recording engineers.

Music videos have supplemented the traditional experience of musical recordings by allowing the association of visual content with tracks of such a recording. In practice, however, music videos have been broadcast, with all the problems of lack of user control which that implies, and they have not contributed to interactivity or participation by the consumer.

On-line services offer opportunities for enriching the experience associated with musical recordings. The present invention is addressed to computer programs, systems, and protocols which can fulfil this promise.

SUMMARY OF THE INVENTION

It is therefore an object of this invention to provide computer programs, systems, and protocols which allow producers to deliver entertainment complementary to musical recordings by means of on-line services such as the Internet. It is a further object of this invention to provide computer programs, systems, and protocols which allow such complementary entertainment to be meaningfully interactive for the consumer, such that the consumer can also be a creator of the experience.

It is a further object of the invention to achieve the foregoing objects by means of implementations designed to attain integration with existing environments and programs, particularly on the Internet, while retaining the flexibility to adapt to the continuing evolution of standards for on-line services.

In one aspect of the invention, software is provided which permits a computer program running on a remote host to control a compact disc (CD) player, DVD player, or the like on a user's computer. (For convenience, we use the term "CD player" to refer also to DVD players and similar devices.) The software is designed to permit the remote host both to initiate actions on the CD player and to become aware of actions which the user has initiated by other control means, such as the buttons on the CD player's front panel or a different CD player control program. This aspect of the invention is a building-block for the provision of complementary entertainment for musical recordings when those recordings are fixed in the prevailing contemporary form, the audio CD.

In a second aspect of the invention, visual content, including interactive content, may be delivered over an on-line service in such a way that it is synchronized to the delivery of content from a musical recording. Such visual content may, for example, be synchronized to the playing of an audio CD in the user's computer. The visual content is thematically linked to the musical recording, for example in the manner of a music video.

In a third aspect of the invention, a method is provided for assigning a unique identifier to musical recordings consisting of a number of tracks. A unique identifier is a useful complement to the delivery of visual content in conjunction with the playing of an audio CD in that it allows the software which delivers the visual content to be sure that the audio CD is in fact the correct CD to which the visual content corresponds. If the visual content is designed, for example, to accompany the Rosary Sonatas of Heinrich Ignaz Franz Biber, it would presumably not function well if the CD in the user's player were the soundtrack for the film Mary Poppins. The unique identifier also allows a CD to be used as a key to access a premium Web area. Furthermore, the unique identifier can allow the user to be directed to an area of the Web corresponding to the CD which is in the user's machine.

In a fourth aspect of the invention, the immensely popular on-line service generally referred to as a "chat room" may be enhanced by means of a link to a musical recording to which all persons in the room are listening. The chat room experience as it exists today in on-line services has a disembodied quality by comparison with traditional face-to-face social encounters, in which there are identifiable surroundings. The only common experience to the chat users today are the words of the chat as they fly by on a computer screen, and perhaps the user icons ("avatars") or other visual content occupying a small space on the screen. The use of a musical recording in conjunction with a chat room opens up the possibility of restoring to the experience a degree of the shared ambience of traditional social encounters. Furthermore, the musical recording offers a focal point that allows chat-seekers to group together by means of shared interests in a particular type of recording.

DESCRIPTION OF PREFERRED EMBODIMENTS

1. Introduction

The preferred embodiment of this invention operates on the World Wide Web. The software implementation environment provided by the World Wide Web is described in a number of books, for example, John December & Mark Ginsburg, *HTML 3.2 and CGI Unleashed* (1996). The World Wide Web is based on a network protocol called HTTP (hypertext transfer protocol), which is described in T. Berners-Lee et al., *Hypertext Transfer Protocol—HTTP/1.0* (Internet Request for Comments No. 1945, 1996). The HTTP protocol must be run atop a general connection-oriented protocol, which today is generally TCP/IP, described in Douglas E. Comer, *Internetworking with TCP/IP* (3d ed. 1995). However, the invention described here is not limited to HTTP running over any particular kind of network software or hardware. The principles of the invention apply to other protocols for access to remote information that may come to compete with or supplant HTTP.

Figure 1:
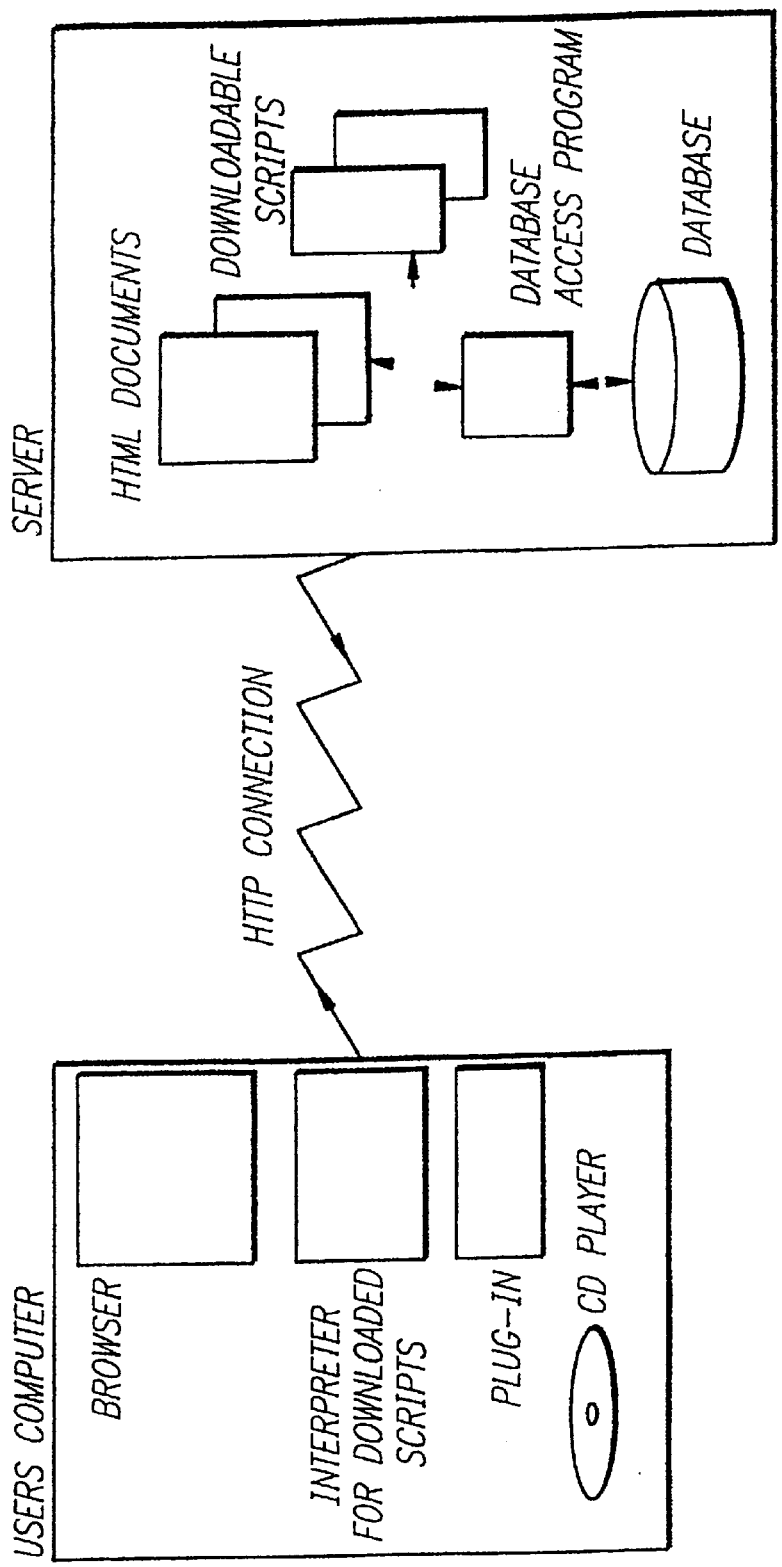
FIG. 1 is a block diagram of the environment in which the preferred embodiment operates.

As shown in FIG. 1, a Web user sits at his or her computer and runs a computer program called a browser. The browser sends out HTTP requests to other computers, referred to as servers. In requests, particular items of data, referred to as resources, which are available on servers, are referred to by means of uniform resource locators (URL's), character strings in a particular format defined in Berners-Lee et al., supra. A URL includes both an identification of the server and an identification of a particular item of data within the server. Reacting to the requests, the servers return responses to the user's browser, and the browser acts upon those responses, generally by displaying some sort of content to the user.

The content portion of the responses can be a "Web page," expressed in the hypertext markup language (HTML). That language allows one to express content consisting of text interspersed with bitmap-format images and links (also known as anchors and hyperlinks). The links are further URL's to which the browser may, at the user's prompting, send further requests.

The responses can also include more complex commands to be interpreted by the browser, e.g., commands which result in an animation. HTML itself does not define complex commands, but rather they are considered to belong to separately-defined scripting languages, of which the two most common ones are JavaScript and VBScript.

In addition to extending the function of the browser by means of code written in a scripting language, it is also possible to extend the function of a browser with compiled code. Such compiled code is referred to as a "plug-in." The precise protocol for writing a plug-in is dependent on the particular browser. Plug-ins for the Microsoft browser are referred to by the name of ActiveX controls.

Plug-ins may be very complex. A plug-in which may advantageously be used in connection with the invention is Shockwave from Macromedia. It permits animations which are part of a server response to be downloaded and played to the user. Shockwave defines its own scripting language called Lingo. Lingo scripts are contained within the downloadable animations which the Shockwave plug-in can play. The general format of a Shockwave animation is a timeline consisting of a series of frames, together with a number of visual objects which appear, perform motions, and disappear at particular frames within the timeline. To achieve more complex effects within a Shockwave animation, Lingo scripts may be invoked in addition to predefined visual objects.

2. Command Plug-In

A preferred embodiment of the invention employs a plug-in, referred to as the command plug-in, which provides to a scripting language the ability to command in a detailed fashion the playing of a musical recording. The command plug-in should provide, at a minimum, the following basic functions:

(1) Start and stop play.

(2) Get current track and position within the track.

(3) Seek to a track and a position within the track.

(4) Get and set volume.

(5) Get information regarding the CD (e.g., the number of tracks, their lengths, the pauses between tracks).

(6) Get information regarding the capabilities of the CD drive.

Other functions may be provided, limited only by what the underlying operating system services are able to provide.

The command plug-in is preferably written in a conventional programming language such as C++. The plug-in must conform to the existing standards for plug-ins, such as those required of Microsoft ActiveX objects. In order to obtain the information and carry out the functions which the command plug-in makes available to the scripting language, the command plug-in relies on functions which provide control and information regarding the playing musical recording. These functions will depend on the precise source of the recording. If, as in the currently preferred embodiment, the recording is being played on an audio CD in the computer CD player, and if the browser is running under Microsoft Windows 3.1 or Windows 95, these functions would be the MCI functions, which form a part of the Win32 application programming interface. These functions are documented, for example, in Microsoft Win32 Programmer's Reference. Different functions may be provided by streaming audio receivers, as for example receivers which capture audio which is coming into the user's computer over a network connection in a suitable audio encoding format such as MPEG.

An important point to note about the implementation of the command plug-in is that the operations which it carries out, as for example seeks, may take times on the order of a second. It is undesirable for the command-plug in to retain control of the machine during that interval, so it is important that the plug-in relinquish control of the machine to the browser whenever a lengthy operation is undertaken, and report on the results of the operation via the asynchronous event handling capability used in the common scripting languages.

Given the above summary of the functions which the command plug-in provides, a general knowledge of how to write plug-ins (e.g., of how to write ActiveX objects), and a knowledge of the relevant application programming interface for controlling the play of the musical recording (e.g., MCI in Win32), a person skilled in the art could readily and without undue experimentation develop an actual working command plug-in. For this reason, further details of how the command plug-in is implemented are not provided here.

3. Synchronization

The existence of a command plug-in providing the functions listed above to a scripting language is a foundation on which entertainment complementary to a musical recording may be constructed. In particular, it is possible to devise, building on this foundation, a method for synchronizing the display of visual content by means of the scripting language with the events which are occurring on the audio CD.

In a preferred embodiment of the invention, the synchronization of the visual content to the audio CD proceeds as follows. The visual content is provided by means of a Shockwave animation, which is downloaded from the server and displayed for the user by means of a Shockwave plug-in. This downloading may take place before the animation is displayed, or alternatively it may take place as the animation is being displayed, provided the user's connection to the network is fast enough to support download at an appropriate speed. The downloading is a function provided by the Shockwave plug-in itself.

As the Shockwave animation is played, a Lingo script executes each time a frame finishes displaying. The Lingo script contains a description of the relationship which should exist between frames of the animation and segments of the musical recording, identified by track number and by time. The Lingo script determines, by means of the command plug-in described above, at which track and time the play of the audio CD is. It then refers to the description in order to determine which frames of the animation correspond to that portion of the audio CD. If the current frame is not one of those frames, the Lingo script resets the time line of the animation so that the animation will begin to play at the frame which corresponds to the current position of the audio CD. This permits the visual content to catch up if it ever lags the CD, for example because downloading from the network has fallen behind, because the user's computer lacks the cycles to play the animation at full speed, or because the user has fast forwarded the CD.

Figure 2:
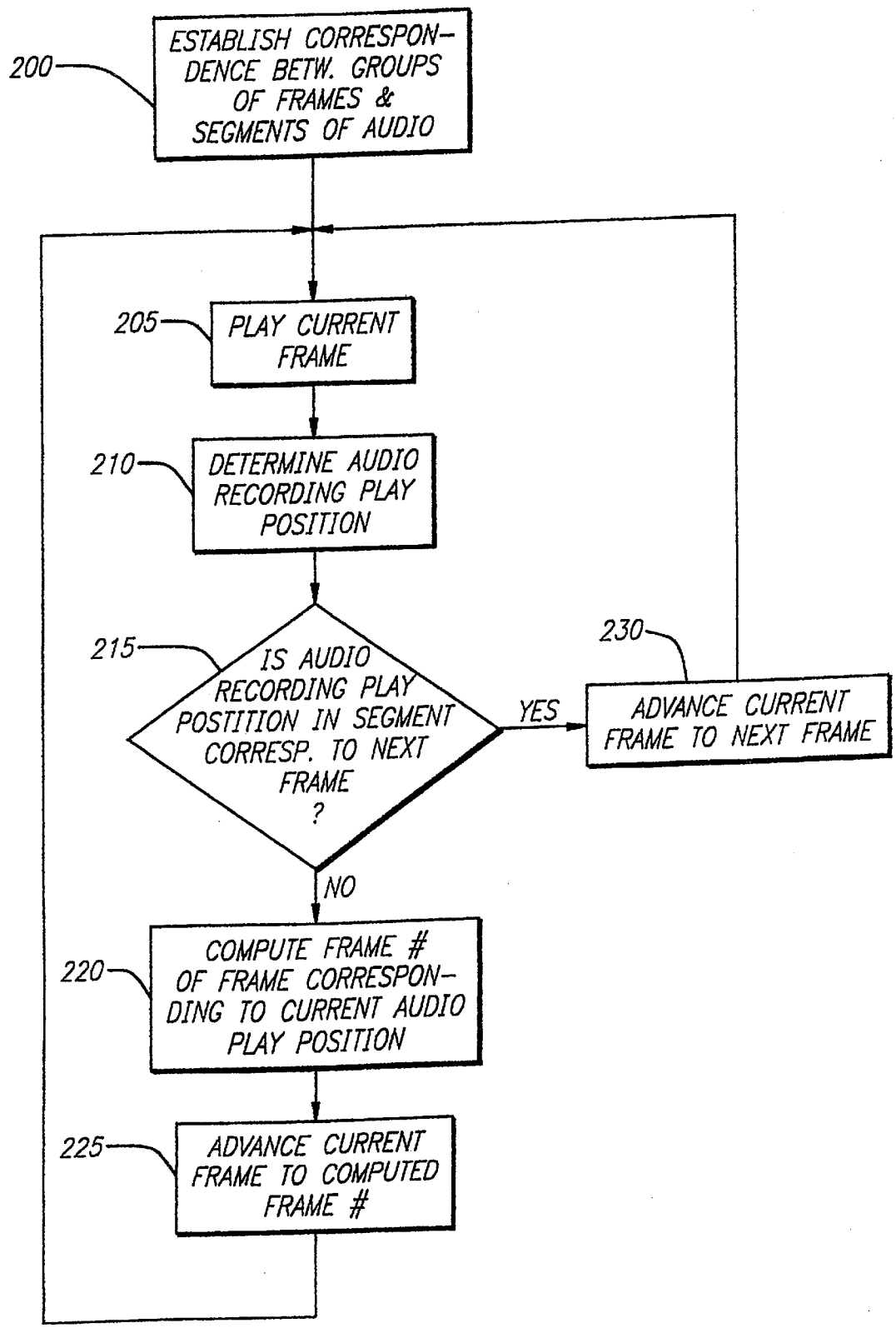
FIG. 2 is a flowchart of the synchronization code of the invention.

In a variant form of this synchronization algorithm (shown in FIG. 2), the frames of the animation are arranged into groups of contiguous frames. A correspondence is established between each such group of frames and a particular segment of the audio recording (box 200 in FIG. 2). At the end of each frame of the animation, the audio play position is determined (box 210). A test is done to determine whether the audio play position is within the segment of the recording that corresponds to the group of frames to which the next sequential frame belongs (box 215). If the audio play position is within that segment, the playback of the animation proceeds with that next frame (box 230). If the audio play position is not within that segment, then the playback of the animation is advanced to the frame corresponding to where the audio is (boxes 220 and 225).

4. Unique Identifiers for Audio CDs

A further aspect of the invention is the ability, by making use of the command plug-in, to provide a technique for establishing a unique identifier for an audio CD which is located in the user's CD player. The unique identifier may be based on the number and lengths of the tracks (measured in blocks, i.e., $1/75$ths of a second), so that the identifier would be a concatenation of these lengths. In practice, however, it is desirable to have a somewhat shorter identifier, so the unique identifier is preferably the concatenation of the track lengths expressed in a fairly coarse unit, such as $1/4$th of a second.

Appendix A contains source code, written in C, for a fuzzy comparison algorithm suitable for determining whether two audio CDs are exactly or approximately the same. The fuzzy comparison algorithm proceeds as follows. For each of the two audio CDs to be compared, one determines the lengths of all the tracks in the recordings in milliseconds. One then shifts all track lengths to the right by eight bits, in effect performing a truncating division by $2^8=256$. One then goes through both of the recordings track by track, accumulating as one proceeds two numbers, the match total and the match error. These numbers are both initialized to zero at the start of the comparison. For each of the tracks, one increments the match total by the shifted length of that track in the first CD to be compared, and one increments the match error by the absolute value of the difference between the shifted lengths of the track in the two CDs. When one gets to the last track in the CD with the fewer number of tracks, one continues with the tracks in the other CD, incrementing both the match total and the match error by the shifted lengths of those tracks. Following these steps of going through the tracks, the algorithm then divides the match error by the match number, subtracts the resulting quotient from 1, and converts the difference to a percentage which is indicative of how well the two CDs match.

Appendix B contains source code, written in C, for a comparison algorithm suitable for determining whether two audio CDs are exactly the same. The algorithm generates from the number of tracks, the track lengths, and the start and end times of the tracks an 8-byte value. The high order 4 bytes are obtained by summing the start and end times of all tracks, expressed in milliseconds. The low order 4 bytes are obtained by summing the lengths of all tracks expressed in milliseconds, shifting the sum left ten bits, and adding the number of tracks.

A unique identifier for a musical recording may be employed as a database key. A site may maintain a database of information about CDs, for example information about all CDs issued by the particular record company can be maintained on that record company's site. There are various alternative ways for users to navigate this information. For example, they could use a Web page containing many hyperlinks as a table of contents, or they could use a conventional search engine. A third way of searching which is enabled by the unique identifier of the invention is for there to be Web page which invites the user to place in the computer's CD drive the CD about which he or she is seeking information. Upon detection of the presence of the CD in the drive, a script in the Web page computes the unique identifier corresponding to the CD and sends it to the server. The server then displays information about the CD retrieved from a database on the basis of that unique identifier. This information may include a Web address (URL) that is related to the audio CD (e.g., that of the artists' home page), simple data such as the names of the songs, and also complementary entertainment, including potentially photographs (e.g., of the band), artwork, animations, and video clips. It is also possible to arrange things so that, when the user inserts an audio CD into the computer, (i) the Web browser is launched if not already running, (ii) the browser computes the CD's unique identifier and from that unique identifier derives a URL, and (iii) the browser does an HITP get transaction on that URL.

An alternative application of unique identifiers for musical recordings is to employ an audio CD as a key for entering into a premium area of the Web. There are presently premium areas of the Web to which people are admitted by subscription. A simple form of admission based on the unique identifier is to require, before accessing a particular area of the Web, that the user place in his or her CD drive a particular CD, or a CD published by a particular company or containing the music of a particular band or artist. This is readily accomplished by means of a script which invokes the functions provided by the command plug-in and computes a unique identifier.

5. Chat Rooms Connected With Musical Recordings

A third aspect of the invention is the connection of chat rooms with musical recordings. The goal is to provide all participants in a chat room with the same music at approximately the same time.

The prevailing network protocol for chat services is Interney Relay Chat (IRC), described J. Oikarinen & D.

Reed, *Internet Relay Chat Protocol* (Internet Request for Comments No. 1459, 1993). In this protocol, when one becomes a client of a chat server, one sends the name of a chat room. The chat server receives messages from all of its of clients and relays the messages sent in by one client to all the other clients connected in the same room as that client. The messages which a client sends are typically typed in by the user who is running the client, and the messages which a client receives are typically displayed for the user who is running the client to read.

Figure 3:
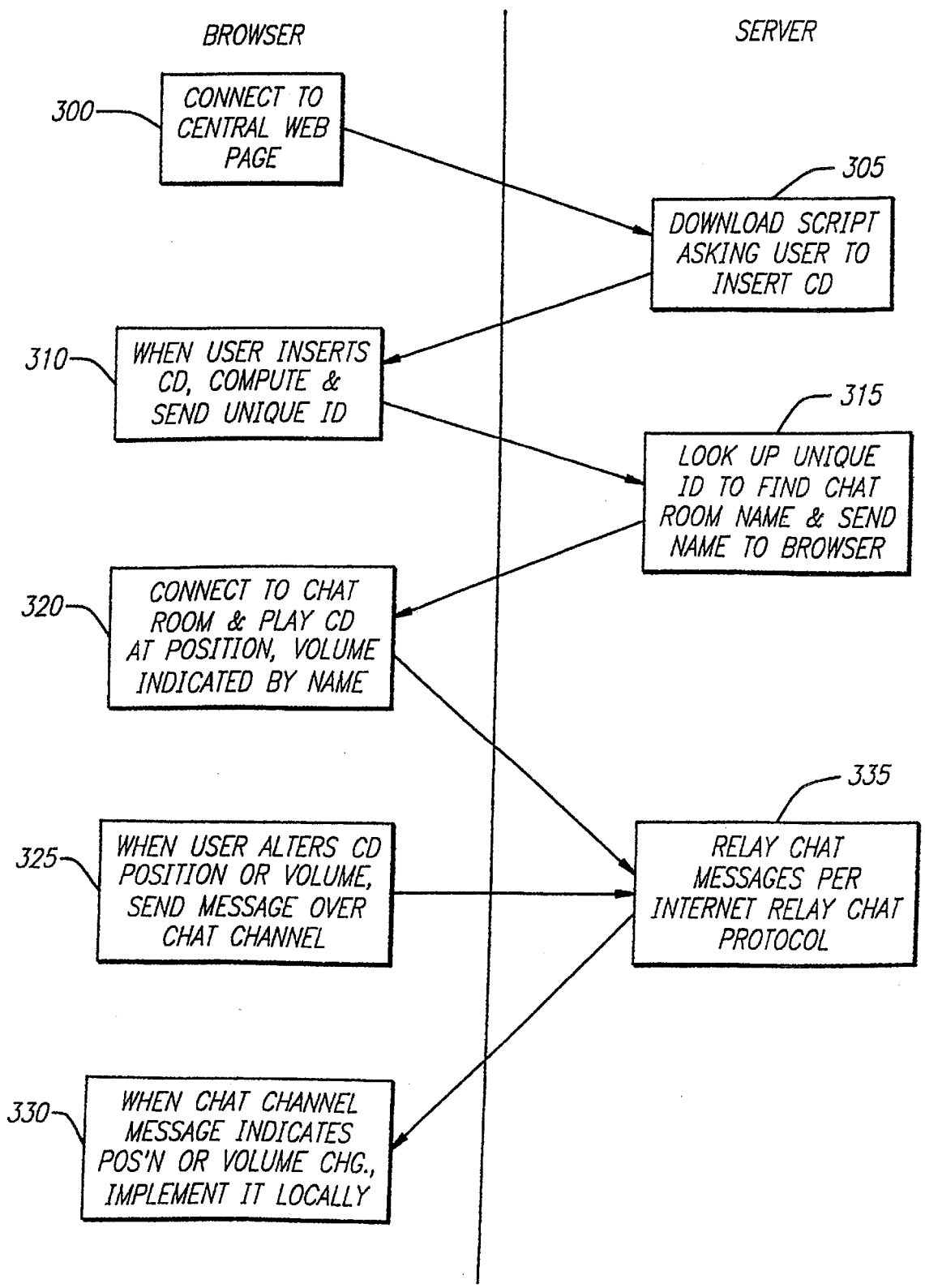
FIG. 3 is a flowchart of the sequence of operations for connection to a chat room focused on a musical recording.

In a preferred embodiment of the invention, a chat client is customized by means of a plug-in, which we will call the chat plug-in. The chat client is started up by a browser as follows (see FIG. 3). The user connects by means of the browser to a central Web page (box 300) which, upon being downloaded, asks that the user insert a CD into his or her player (box 305). A unique identifier of the CD is computed and communicated back to the server by using the control plug-in described above under the command of a script in the central Web page (box 310). The server then employs the unique identifier to determine whether it has a chat room focused on the CD (box 315). This step may be carried out by looking the unique identifier up in a database using techniques well known in the art. There exists a vast literature on connecting Web pages to databases, e.g., December & Ginsburg, supra, chapter 21. If a chat room focused on the CD exists or can be created, the server responds with the name of that chat room, and the browser starts up a chat client on the user's computer as a client of that chat room (box 320).

The chat room's name is set by the server to contain information about the track which the CD is playing in the other chat room clients' machines and the time at which the track started to play, as well as about the volume at which the CD is playing. The chat client plug-in employs that information to direct the control plug-in to set the CD in the user's. computer to play in such a manner that it is approximately synchronized to the CD which is playing in the other chat room clients' machines (box 320).

Each user in the chat room is able to control the CD which is playing in his or her machine. Control actions result in the chat plug-in sending messages to the chat server which describe the control action being taken (box 325). For example, such messages may indicate a change in the position of the CD, a change in the volume, or the ejection of the CD to replace it with another. The chat plug-ins running on the other users' machines, upon seeing a message of this kind, replicate the action (as far as possible) on the other users' machines by using the control plug-in described above (box 330).

In a further aspect of the invention, a chat room focused on a particular musical recording might allow for a voting procedure to select particular tracks. A simple voting procedure would be for each chat plug-in to act upon a change message of the kind described in the preceding paragraph only when it sees two identical consecutive change messages. This would mean that in order to change the track which is being played, it would be necessary for two users to change to that track. The number two may be replaced by a higher number.

In a further aspect of the invention the messages delivered to the users of a chat can be driven from a text file rather than manual typing. This would allow a pre-recorded experience to be played back for a group of chat users. Such a technique may be used to create a pre-recorded, narrated tour of an audio CD.

An important advantage of the preferred embodiment as described above is that it may be used with any chat server software which supports the minimal functionality required by Internet Relay Chat or by a protocol providing similar minimum chat service. The additional software required is located in the chat client plug-in and in the central Web page, with its connection to a database of CD information.

---

APPENDIX A

```
/*
 * FUZZY CD ID
 * (c) 1996 ION
 *
 *
 * by Ty Roberts
 */
#include <stdio.h>
#include <stdlib.h>
#include <time.h>
struct fuzzyCDid {
    short     numTracks; // start time in milliseconds
    unsigned short    fuzzlength[100];
};
typedef struct fuzzyCDid fuzzyCDid, *fuzzyCDidPtr;
// structure of a cd track with all times stored in milliseconds
struct cdtrack {
    long beginMs;     // start time in milliseconds
    long endMs;            // end time in milliseconds
    long lengthMs;     // length in milliseconds
};
typedef struct cdtrack cdtrack, *cdTrackPtr;
struct cd {
    short numTracks;
    cdtrack       track[100];
};
typedef struct cd cd, *cdPtr;
void CreateFuzzyId( fuzzyCDidPtr fid, cdPtr cd );
float FuzzyMatch( fuzzyCDidPtr fid1, fuzzyCDidPtr fid2 );
```

APPENDIX A

```
// SUBROUTINES
void CreateFuzzyId( fuzzyCDidPtr fid, cdPtr cd )
{
    long     i;
    // first copy in the number of tracks
    fid->numTracks = cd->numTracks;
    for(i=0;i<fid->numTracks;i++) {
        // shift left and create a MSB length thats not exact
        fid->fuzzlength[i] = (short)(cd->track[i].lengthMs>>8);
    }
}
float FuzzyMatch( fuzzyCDidPtr fid1, fuzzyCDidPtr fid2)
{
    long    fidmatcherr. = 0, fidmatchtotal = 0;
    short   i, trackcnt;
    float   matchpercent;
    // find the larger number of tracks
    trackcnt = fid1->numTracks<fid2->numTracks ? fid2->numTracks : fid1->numTracks;
    // cycle thru the tracks accumulating error and total comparedtimes
    for(i=0;i<trackcnt;i++) {
        if ((i < fid1->numTracks) && (i < fid2->numTracks)) {
            fidmatcherr += abs(fid1->fuzzlength[i]-fid2->fuzzlength[i]);
            fidmatchtotal += fid1->fuzzlength[i];
        } else if (i >= fid2->numTracks) {
            fidmatcherr += fid1->fuzzlength[i];
            fidmatchtotal += fid1->fuzzlength[i];
        } else if (i >= fid1->numTracks) {
            fidmatcherr += fid2->fuzzlength[i];
            fidmatchtotal += fid2- >fuzzlength[i];
        }
    }
    if (fidmatcherr > 0) {
        matchpercent = 100 - (((float)fidmatcherr/(float)fidmatchtotal)*100);
    } else {
        matchpercent = 100;
    }
    return matchpercent;
}
void main(void)
{
    short i;
    float matchpercent;
    // create global structures for two complete cds with up to 100 tracks
    cd cd2id;
    fuzzyCDid fidcd2id;
    cd cdFromDB;
    fuzzyCDid fidcdFromDB;
    printf ("Test #1 will compare two CDs that are exactly the same\n\n");
    // put in some test values for the cd track lengths
    // since these are in ms, its basically 60000 = 1 minute
    cd2id.track[0].lengthMs = 121323;
    cd2id.track[1].lengthMs = 234565;
    cd2id.track[2].lengthMs = 566437;
    cd2id.track[3].lengthMs = 245120;
    cd2id.track[4].lengthMs = 20000;
    cd2id.track[5].lengthMs = 120386;
    cd2id.track[6].lengthMs = 323453;
    cd2id.numTracks = 7;
    for(i=1;i<cd2id.numTracks;i++) {
        printf ("CD #1: Track = %d length in minutes = %f\n",
            i, (float)cd2id.track[i].lengthMs/60000.0);
    }
    printf("\n");
    cdFromDB.track[0].lengthMs = 121323;
    cdFromDB.track[1].lengthMs = 234565;
    cdFromDB.track[2].lengthMs = 566437;
    cdFromDB.track[3].lengthMs = 245120;
    cdFromDB.track[4].lengthMs = 20000;
    cdFromDB.track[5].lengthMs = 120386;
    cdFromDB.track[6].lengthMs = 323453;
    cdFromDB.numTracks = 7;
    for(i=1;i<cdFromDB.numTracks;i++) {
        printf ("CD #2: Track = %d length in minutes = %f\n",
            i, (float)cdFromDB.track[i].lengthMs/60000.0);
    }
    CreateFuzzyId( &fidcd2id, &cd2id );
```

-continued

APPENDIX A

```
    CreateFuzzyId( &fidcdFromDB, &cdFromDB );
    matchpercent = FuzzyMatch( &fidcd2id, &fidcdFromDB);
    printf ("The cd's matchpercent was computed as=%f", matchpercent);
    printf ("\n");
    printf ("\n");
    printf ("Test #2 will compare two cd that are nearly the same\nexcept they have
diffent # of tracks \n");
    // put in some test values for the cd track lengths
    // since these are in ms, its basically 60000 = 1 minute
    cd2id.track[0].lengthMs = 121323;
    cd2id.track[1].lengthMs = 234565;
    cd2id.track[2].lengthMs = 566437;
    cd2id.track[3].lengthMs = 245120;
    cd2id.track[4].lengthMs = 20000;
    cd2id.track[5].lengthMs = 120386;
    cd2id.track[6].lengthMs = 323453;
    cd2id.numTracks = 7;
    for(i=1;i<cd2id.numTracks;i++) {
        printf ("CD #1: Track = %d length in minutes = %f\n",
            i, (float)cd2id.track[i].lengthMs/60000.0);
    }
    printf ("\n");
    cdFromDB.track[0].lengthMs = 121323;
    cdFromDB.track[1].lengthMs = 234565;
    cdFromDB.track[2].lengthMs = 566437;
    cdFromDB.track[3].lengthMs = 245120;
    cdFromDB.track[4].lengthMs = 20000;
    cdFromDB.track[5].lengthMs = 120386;
    cdFromDB.numTracks = 6;
    for(i=1;i<cdFromDB.numTracks;i++) {
        printf ("CD #2: Track = %d length in minutes = %f\n",
            i, (float)cdFromDB.track[i].lengthMs/60000.0);
    }
    CreateFuzzyId( &fidcd2id, &cd2id );
    CreateFuzzyId( &fidcdFromDB, &cdFromDB );
    matchpercent = FuzzyMatch( &fidcd2id, &fidcdFromDB);
    printf ("The cd's matchpercent was computed as=%f",matchpercent);
    printf ("\n");
    printf ("\n");
    printf ("Test #3 will compare two cd that are not the same\n\n");
    // put in some test values for the cd track lengths
    // since these are in ms, its basically 60000 = 1 minute
    cd2id.track[0].lengthMs = 34213;
    cd2id.track[1].lengthMs = 334565;
    cd2id.track[2].lengthMs = 231423;
    cd2id.track[3].lengthMs = 134122;
    cd2id.track[4].lengthMs = 2342;
    cd2id.track[5].lengthMs = 3487;
    cd2id.track[6].lengthMs = 9976;
    cd2id.numTracks = 7;
    for(i=1;i<cd2id.numTracks;i++) {
        printf ("CD #1: Track = %d length in minutes = %f\n",
            i, (float)cd2id.track[i].lengthMs/60000.0);
    }
    printf ("\n");
    cdFromDB.track[0].lengthMs = 121323;
    cdFromDB.track[1].lengthMs = 234565;
    cdFromDB.track[2].lengthMs = 566437;
    cdFromDB.track[3].lengthMs = 245120;
    cdFromDB.track[4].lengthMs = 20000;
    cdFromDB.track[5].lengthMs = 120386;
    cdFromDB.track[6].lengthMs = 323453;
    cdFromDB.numTracks = 6;
    for(i=1;i<cdFromDB.numTracks;i++) {
        printf ("CD #2: Track = %d length in minutes = %f\n",
            i, (float)cdFromDB.track[i].lengthMs/60000.0);
    }
    CreateFuzzyId( &fidcd2id, &cd2id);
    CreateFuzzyId( &fidcdFromDB, &cdFromDB);
    matchpercent = FuzzyMatch( &fidcd2id, &fidcdFromDB);
    printf ("The cd's matchpercent was computed as=%f",matchpercent);
}
```

APPENDIX B

```c
/*
 * EXACT MATCH CD ID
 * - 1996 ION
 *
 *
 * by Ty Roberts
 */
#include <stdio.h>
#include <stdlib.h>
#include <time.h>
struct cdid{
        long   id[2];
};
typedef struct cdid cdid, *cdidPtr;
// structure of a cd track with all times stored in milliseconds
struct cdtrack{
        long    beginMs;        // start time in miliseconds
        long    endMs;          // end time in milliseconds
        long    lengthMs;       //length in Miliseconds
};
typedef struct cdtrack cdtrack, *cdTrackPtr;
struct cd {
        short   numTracks;
        cdtrack         track[100];
};
typedef struct cd cd, *cdPtr;
void CreateUniqueId( cdidPtr cid, cdPtr cd );
// SUBROUTINES
void CreateUniqueId( cdidPtr cid, cdPtr cd )
{
        long            i, t, n;
        t = 0;
        n = 0;
        for(i=0;i<cd->numTracks;i++) {
           // shift left and create a MSB length thats not exact
           t +=cd->track[i].lengthMs;
           n +=cd->track[i].beginMs + cd->track[i].endMs;
        }
        cid->id[0] = t<<10+cd->numTracks;
        cid->id[1] = n;
}
void main(void)
{
        short i;
        short   matchtest;
        // create global structures for two complete cds with up to 100
        tracks
        cd      cd2id;
        cdid cd2UID;
        cd      cdFromDB;
        cdid cdFromDBUID;
        printf ("Test #1 will compare two cd that are exactly the
        same\n\n");
        // put in some test values for the cd track lengths
        // since thes are in ms, its basically 60000 = 1 minute
        cd2id.track[0].beginMs = 0;
        cd2id.track[1].beginMs = 100001;
        cd2id.track[2].beginMs = 231001;
        cd2id.track[3].beginMs = 345001;
        cd2id.track[4].beginMs = 435001;
        cd2id.track[5].beginMs = 460001;
        cd2id.track[6].beginMs = 590001;
        cd2id.track[0].endMs = 100000;
        cd2id.track[1].endMs = 231000;
        cd2id.track[2].endMs = 345000;
        cd2id.track[3].endMs = 435000;
        cd2id.track[4].endMs = 460000;
        cd2id.track[5].endMs = 590000;
        cd2id.track[6].endMs = 690000;
        cd2id.track[0].lengthMs =
        cd2id.track[0].endMs - cd2id.track[0].beginMs;
        cd2id.track[1].lengthMs =
        cd2id.track[1].endMs - cd2id.track[1].beginMs;
        cd2id.track[2].lengthMs =
        cd2id.track[2].endMs - cd2id.track[2].beginMs;
        cd2id.track[3].lengthMs =
        cd2id.track[3].endMs - cd2id.track[3].beginMs;
        cd2id.track[4].lengthMs =
        cd2id.track[4].endMs - cd2id.track[4].beginMs;
        cd2id.track[5].lengthMs =
        cd2id.track[5].endMs - cd2id.track[5].beginMs;
        cd2id.track[6].lengthMs =
        cd2id.track[6].endMs - cd2id.track[6].beginMs;
        cd2id.numTracks = 7;
        for(i=1;i<cd2id.numTracks;i++) {
            printf ("CD #1: Track = %d length inminutes = %f\n", i,
        (float)cd2id.track[i].lengthMs/60000.0);
        }
        printf ("\n");
        cdFromDB.track[0].beginMs = 0;
        cdFromDB.track[1].beginMs = 100001;
        cdFromDB.track[2].beginMs = 231001;
        cdFromDB.track[3].beginMs = 345001;
        cdFromDB.track[4].beginMs = 435001;
        cdFromDB.track[5].beginMs = 460001;
        cdFromDB.track[6].beginMs = 590001;
        cdFromDB.track[0].endMs = 100000;
        cdFromDB.track[1].endMs = 231000;
        cdFromDB.track[2].endMs = 345000;
        cdFromDB.track[3].endMs = 435000;
        cdFromDB.track[4].endMs = 460000;
        cdFromDB.track[5].endMs = 590000;
        cdFromDB.track[6].endMs = 690000;
        cdFromDB.track[0].lengthMs =
        cdFromDB.track[0].endMs - cdFromDB.track[0].beginMs;
        cdFromDB.track[1].lengthMs =
        cdFromDB.track[1].endMs - cdFromDB.track[1].beginMs;
        cdFromDB.track[2].lengthMs =
        cdFromDB.track[2].endMs - cdFromDB.track[2].beginMs;
        cdFromDB.track[3].lengthMs =
        cdFromDB.track[3].endMs - cdFromDB.track[3].beginMs;
        cdFromDB.track[4].lengthMs =
        cdFromDB.track[4].endMs - cdFromDB.track[4].beginMs;
        cdFromDB.track[5].lengthMs =
        cdFromDB.track[5].endMs - cdFromDB.track[5].beginMs;
        cdFromDB.track[6].lengthMs =
        cdFromDB.track[6].endMs - cdFromDB.track[6].beginMs;
        cdFromDB.numTracks = 7;
        for(i=1;i<cdFromDB.numTracks;i++) {
            printf ("CD #2: Track = %d   length inminutes = %f\n", i,
        (float)cdFromDB.track[i].lengthMs/60000.0);
        }
        CreateUniqueId( &cd2UID, &cd2id );
        printf( "Unique ID for CD #1 = %d%d\n",
        cd2UID.id[0], cd2UID.id[1]);
        CreateUniqueId( &cdFromDBUID, &cdFromDB );
        printf( "Unique ID for CD #2 = %d%d\n",
        cdFromDBUID.id[0],
cdFromDBUID.id[1]);
        matchtest = (cd2UID.id[0] == cdFromDBUID.id[0])
                 && (cd2UID.id[1] ==
cdFromDBUID.id[1]);
        printf ("The cd's match if result is non zero matchresult=
        %d",matchtest);
        printf ("\n");
        printf ("\n");
        printf ("Test #2 will compare two cd that are
        nearly the same\nexcept they have diffent # of tracks \n");
        // put in some test values for the cd track lengths
        // since thes are in ms, its basically 60000 = 1 minute
        cd2id.track[0].beginMs = 0;
        cd2id.track[1].beginMs = 100001;
        cd2id.track[2].beginMs = 231001;
        cd2id.track[3].beginMs = 345001;
        cd2id.track[4].beginMs = 435001;
        cd2id.track[5].beginMs = 460001;
        cd2id.track[6].beginMs = 590001;
        cd2id.track[0].endMs = 100000;
        cd2id.track[1].endMs = 231000;
        cd2id.track[2].endMs = 345000;
        cd2id.track[3].endMs = 435000;
        cd2id.track[4].endMs = 460000;
        cd2id.track[5].endMs = 590000;
        cd2id.track[6].endMs = 690000;
        cd2id.track[0].lengthMs =
        cd2id.track[0].endMs - cd2id.track[0].beginMs;
        cd2id.track[1].lengthMs =
        cd2id.track[1].endMs - cd2id.track[1].beginMs;
```

APPENDIX B-continued

```
    cd2id.track[2].lengthMs =
    cd2id.track[2].endMs – cd2id.track[2].beginMs;
    cd2id.track[3].lengthMs =
    cd2id.track[3].endMs – cd2id.track[3].beginMs;
    cd2id.track[4].lengthMs =
    cd2id.track[4].endMs – cd2id.track[4].beginMs;
    cd2id.track[5].lengthMs =
    cd2id.track[5].endMs – cd2id.track[5].beginMs;
    cd2id.track[6].lengthMs =
    cd2id.track[6].endMs – cd2id.track[6].beginMs;
    cd2id.numTracks = 7;
    for(i=1;i<cd2id.numTracks;i++) {
        printf ("CD #1: Track = %d   length inminutes = %f\n", i,
(float)cd2id.track[i].lengthMs/60000.0);
    }
    printf ("\n");
    cdFromDB.track[0].beginMs = 0;
    cdFromDB.track[1].beginMs = 100001;
    cdFromDB.track[2].beginMs = 231001;
    cdFromDB.track[3].beginMs = 345001;
    cdFromDB.track[4].beginMs = 435001;
    cdFromDB.track[5].beginMs = 460001;
    cdFromDB.track[6].beginMs = 590001;
    cdFromDB.track[0].endMs = 100000;
    cdFromDB.track[1].endMs = 231000;
    cdFromDB.track[2].endMs = 345000;
    cdFromDB.track[3].endMs = 435000;
    cdFromDB.track[4].endMs = 460000;
    cdFromDB.track[5].endMs = 590000;
    cdFromDB.track[0].lengthMs =
    cd2id.track[0].endMs – cd2id.track[0].beginMs;
    cdFromDB.track[1].lengthMs =
    cd2id.track[1].endMs – cd2id.track[1].beginMs;
    cdFromDB.track[2].lengthMs =
    cd2id.track[2].endMs – cd2id.track[2].beginMs;
    cdFromDB.track[3].lengthMs =
    cd2id.track[3].endMs – cd2id.track[3].beginMs;
    cdFromDB.track[4].lengthMs =
    cd2id.track[4].endMs – cd2id.track[4].beginMs;
    cdFromDB.track[5].lengthMs =
    cd2id.track[5].endMs – cd2id.track[5].beginMs;
    cdFromDB.numTracks = 6;
    for(i=1;i<cdFromDB.numTracks;i++) {
        printf ("CD #2: Track = %d length inminutes = %f\n",i,
(float)cdFromDB.track[i].lengthMs/60000.0 );
    }
    CreateUniqueId( &cd2UID, &cd2id );
    printf( "Unique ID for CD #1 = %d%d\n",
    cd2UID.id[0], cd2UID.id[1] );
    CreateUniqueId( &cdFromDBUID, &cdFromDB );
    printf( "Unique ID for CD #2 = %d%d\n",
    cdFromDBUID.id[0],
cdFromDBUID.id[1] );
    matchtest = (cd2UID.id[0] == cdFromDBUID.id[0])
    && (cd2UID.id[1] ==
cdFromDBUID.id[1]);
    printf ("The cd's match if result is non zero matchresult=
    %d",matchtest);
    printf ("\n");
    printf ("\n");
}
```

What is claimed is:

1. A method for associating local and remote data on a local computer connected to a network, comprising:
   automatically executing a program on the local computer when a recording is played, to obtain at least one uniform resource locator corresponding to the recording from at least one database of recording identifiers and uniform resource locators stored on at least one remote computer connected to the local computer via the network;
   obtaining the remote data via the network from a location identified by the at least one uniform resource locator; and
   outputting the remote data on the local computer.

2. A method as recited in claim 1, further comprising maintaining in the at least one database an association between the recording identifiers and the uniform resource locators of corresponding Internet resources for a plurality of recordings released by an organization.

3. A method as recited in claim 2, wherein the recording is a compact disc, the plurality of recordings are compact discs and the organization is a record company.

4. A method as recited in claim 2, wherein the recording is a digital versatile disc, the plurality of recordings are digital versatile discs and the organization is a record company.

5. A method as recited in claim 2, wherein the recording is an electronic file of digitally encoded audio and the plurality of recordings are electronic files of digitally encoded audio.

6. A method as recited in claim 1, wherein the at least one uniform resource locator includes an address of a World Wide Web page maintained on behalf of at least one person who produced sound for the recording.

7. A method as recited in claim 6, wherein the World Wide Web page includes information about live events at which the at least one person will appear in the future.

8. A method as recited in claim 7,
   wherein the World Wide Web page includes access to tickets for live events at which the at least one person will appear in the future, and
   wherein said method further comprises purchasing tickets using the World Wide Web and a browser program running on the local computer.

9. A method as recited in claim 6, wherein the remote data includes at least one of an image of the at least one person, a video in which the at least one person appears and biographical information about the at least one person.

10. A method for associating a recording with output of data on a local computer connected to a network, comprising:
    determining an identifier from information associated with the recording;
    comparing the identifier with records in a database maintained on a remote computer coupled to the local computer via the network; and
    outputting remote data obtained from the network upon verification of access to the recording by the local computer, the remote data obtained via the network from at least one storage location dynamically determined based on the identifier.

11. A method as recited in claim 10,
    wherein the recording is stored on one of a compact disc and a digital versatile disc, and
    wherein said comparing determines that the disc is one of a group of discs released by at least one company.

12. A method of delivering content complementary to a compact disc inserted in a compact disc player coupled with a computer connected to a network, comprising:
    receiving the compact disc in the compact disc player coupled with the computer;
    determining an identifier for the compact disc;
    retrieving from a remote computer via the network a uniform resource locator related to the identifier;
    linking to a remote device via the network, in response to the uniform resource locator; and
    delivering content complementary to the compact disc from the remote device to the computer via the network.

13. A method as recited in claim 12, further comprising:
detecting insertion of the compact disc in the compact disc player; and
automatically starting a client program within the computer to cause the computer to access the network when the compact disc is inserted in the compact disc player.

14. A method as recited in claim 12, further comprising:
collecting use data from the computer, the use data related to at least one of a portion of the compact disc played, play time of the compact disc and user demographics; and
transferring the use data from the computer to the remote device via the network.

15. A method as recited in claim 14, further comprising continuing said collecting and transferring of the use data from the computer to the remote device via the network as long as the compact disc is in the compact disc player.

16. A method of delivering content complementary to a compact disc inserted in a compact disc player coupled with a computer connected to a network, comprising:
inserting the compact disc in the compact disc player coupled with the computer;
determining an identifier for the compact disc;
retrieving a uniform resource locator related to the identifier, including
searching a local cache for the identifier;
connecting to a remote look-up server to search for the identifier and to return at least one uniform resource locator related thereto, when the identifier is not found in the local cache within a predetermined period of time;
storing the at least one uniform resource locator returned from the remote look-up server in the local cache; and
providing the at least one uniform resource locator related to the identifier for said linking, when the identifier is found in the local cache and when the at least one uniform resource locator is returned from the remote look-up server;
linking to a remote device via the network, in response to the uniform resource locator; and
delivering content complementary to the compact disc from the remote device to the computer via the network.

17. A method as recited in claim 16,
wherein a plurality of uniform resource locators related to the identifier are returned from the remote look-up server, and
wherein said linking initially links to a selected remote device corresponding to one of the uniform resource locators related to the identifier.

18. A method as recited in claim 12,
wherein said determining is performed automatically upon insertion of the compact disc,
wherein said retrieving of the uniform resource locator related to the identifier automatically retrieves a plurality of uniform resource locators related to the identifier upon determination of the identifier for the compact disc, and
wherein said linking automatically links the computer to a selected remote device corresponding to one of the uniform resource locators related to the identifier.

19. A method of accessing content related to a recording accessible to a local computer connected to a network, comprising:
determining an identifier for the recording; and
linking to a remote device via the network using the identifier as a password to access the remote device.

20. A computer system, coupled to a network, to associate remote data and audio, comprising:
a playback unit, located at a first location, to play a recording;
a communication unit, located at the first location, to obtain remote data from the network using at least one uniform resource locator corresponding to the recording;
an output unit, located at the first location, to output the remote data; and
a remote computer, coupled to said communication unit via the network and located at a second location remote from the first location, storing at least one database of recording identifiers and uniform resource locators and providing said communication unit with the at least one uniform resource locator.

21. A computer system as recited in claim 20, wherein the at least one database stored on said remote computer associates the recording identifiers with uniform resource locators of corresponding World Wide Web pages for a plurality of recordings released by an organization.

22. A computer system as recited in claim 20, wherein the at least one uniform resource locator includes an address of a World Wide Web page maintained on behalf of at least one person who produced sound for the recording.

23. A computer system as recited in claim 22,
wherein the World Wide Web page includes access to tickets for live events at which the at least one person will appear in the future, and
wherein said computer system further comprises a processor, coupled to said playback, communication, and output units, to execute a browser program and instructions to purchase tickets using the World Wide Web.

24. At least one computer program stored on a computer-readable medium, embodying a method for associating a recording with output of remote data on a local computer connected to a network, comprising:
prompting input of a disc containing the recording;
verifying access at the local computer to the recording on the disc by
determining an identifier from information associated with the recording, and
comparing the identifier with records in a database maintained on a remote computer coupled to the local computer via the network; and
outputting remote data obtained via the network from at least one storage location dynamically determined after said verifying.

25. At least one computer program as recited in claim 24,
wherein the disc is one of a compact disc and a digital versatile disc, and
wherein said comparing determines that the disc is one of a group of discs released by at least one company.

26. At least one computer program stored on a computer-readable medium, embodying a method for delivering content complementary to a compact disc inserted into a compact disc player coupled with a computer connected to a network, comprising:
detecting insertion of the compact disc in the compact disc player coupled with the computer;
determining an identifier for the compact disc;

retrieving from a remote computer via the network a uniform resource locator related to the identifier;

linking to a remote device via the network, based on the uniform resource locator; and delivering content complementary to the compact disc from the remote device to the computer via the network.

27. At least one computer program as recited in claim 26, further comprising: automatically starting a client program within the computer to cause the computer to access the network when the compact disc is inserted in the compact disc player.

28. At least one computer program as recited in claim 26, further comprising:

collecting use data from the computer, the use data related to at least one of a portion of the compact disc played, play time of the compact disc and user demographics; and transferring the use data from the computer to the remote device via the network.

29. At least one computer program as recited in claim 28, further comprising continuing said collecting and transferring of the use data from the computer to the remote device via the network as long as the compact disc is in the compact disc player.

30. At least one computer program stored on a computer-readable medium, embodying a method for delivering content complementary to a compact disc inserted into a compact disc player coupled with a computer connected to a network, comprising:

inserting the compact disc in the compact disc player coupled with the computer;

determining an identifier for the compact disc;

retrieving a uniform resource locator related to the identifier, including searching a local cache for the identifier;

connecting to a remote look-up server to search for the identifier and return at least one uniform resource locator related thereto, when the identifier is not found in the local cache within a predetermined period of time;

storing the at least one uniform resource locator returned from the remote look-up server in the local cache; and providing the at least one uniform resource locator related to the identifier, when the identifier is found in the local cache and when the at least one uniform resource locator is returned from the remote look-up server;

linking to a remote device via the network, based on the uniform resource locator; and delivering content complementary to the compact disc from the remote device to the computer via the network.

31. At least one computer program as recited in claim 30, wherein a plurality of uniform resource locators related to the identifier are returned from the remote look-up server, and wherein said linking initially links to a selected remote device corresponding to one of the uniform resource locators related to the identifier.

32. At least one computer program as recited in claim 26, wherein said determining is performed automatically upon insertion of the compact disc, wherein said retrieving of the uniform resource locator related to the identifier automatically retrieves a plurality of uniform resource locators related to the identifier upon determination of the identifier for the compact disc, and wherein said linking automatically links the computer to a selected remote device corresponding to one of the uniform resource locators related to the identifier.

33. At least one computer program stored on a computer-readable medium, embodying a method for delivering content complementary to a compact disc inserted into a compact disc player coupled with a computer connected to a network, comprising:

inserting the compact disc in the compact disc player coupled with the computer;

determining an identifier for the compact disc;

retrieving a uniform resource locator related to the identifier;

linking to a remote device at the uniform resource locator via the network includes using the identifier as a password to access the remote site; and delivering content complementary to the compact disc from the remote device to the computer via the network.

34. A method for associating remote and local data on a local device connected to a network, comprising:

automatically executing a program on the local device when the local data is accessed, to obtain at least one uniform resource locator, corresponding to the local data, from at least one database of local data identifiers and uniform resource locators stored on at least one remote device connected to the local device via the network;

obtaining the remote data using the at least one uniform resource locator; and outputting at the local device the remote data obtained from the network.

35. A method as recited in claim 34, further comprising maintaining in the at least one database an association between the local data identifiers and the uniform resource locators of corresponding Internet resources for a plurality of items of local data provided by an organization.

36. A method as recited in claim 35, wherein the local data are stored in a recording and are accessed to play the recording for a user of the local device.

37. A method as recited in claim 36, wherein the recording is an electronic file of digitally encoded audio and the items of local data are electronic files of digitally encoded audio.

38. A method as recited in claim 37, wherein the at least one uniform resource locator includes an address of a World Wide Web page maintained on behalf of at least one person who produced sound for the recording.

39. A method as recited in claim 38, wherein the World Wide Web page includes information about live events at which the at least one person will appear.

40. A method as recited in claim 39, wherein the World Wide Web page includes access to tickets for live events at which the at least one person will appear in the future, and wherein said method further comprises purchasing tickets using the World Wide Web and a browser program running on the local device.

41. A method as recited in claim 38, wherein the remote data include at least one of an image of the at least one person, a video in which the at least one person appears and biographical information about the at least one person.

42. A method as recited in claim 38, wherein the remote data include an electronic file of digitally encoded audio.

43. A method as recited in claim 34, wherein the remote data include an electronic file of digitally encoded audio.

44. A method for associating remote and local data on a local device connected to a network, the local data including an electronic file of digitally encoded audio stored on one of a compact disc and a digital versatile disc, said method comprising:
   determining an identifier from information associated with the local data accessed by the local device when the one of a compact disc and a digital versatile disc is inserted into the local device;
   automatically executing, when the local data is accessed, a communication program for communication via the network, after initiating the communication program if the communication program has not been initiated previously;
   automatically requesting remote data based on the identifier; and
   automatically outputting at the local device the remote data obtained from the network.

45. A method of delivering content complementary to a recording ready for playback by a local device connected to a network, comprising:
   determining an identifier for the recording;
   retrieving from a remote device via the network a uniform resource locator related to the identifier;
   linking to the remote device via the network, based on the uniform resource locator; and
   delivering content complementary to the recording from the remote device to the local device via the network.

46. A method as recited in claim 45,
   wherein the local device is a computer connected to the remote device via the network, and
   wherein said method further comprises:
      detecting access to the recording by the computer; and
      automatically starting a client program within the computer to control the computer when the recording is accessed.

47. A method as recited in claim 45, further comprising:
   collecting use data from the local device, the use data related to at least one of playback of a portion of the recording, play time of the recording and user demographics; and
   transferring the use data from the local device to the remote device via the network.

48. A method as recited in claim 47, further comprising continuing said collecting and transferring of the use data from the local device to the remote device via the network as long as the recording is being played.

49. A method as recited in claim 45, wherein said retrieving of the uniform resource locator related to the identifier includes
   searching a local cache for the identifier;
   connecting to a remote look-up server to search for the identifier and return at least one uniform resource locator related thereto, when the identifier is not found in the local cache within a predetermined period of time;
   storing the at least one uniform resource locator returned from the remote look-up server in the local cache; and
   providing the at least one uniform resource locator related to the identifier for said linking, when the identifier is found in the local cache and when the at least one uniform resource locator is returned from the remote look-up server.

50. A method as recited in claim 49,
   wherein a plurality of uniform resource locators related to the identifier are returned from the remote look-up server, and
   wherein said linking initially links to a selected remote device corresponding to one of the uniform resource locators related to the identifier.

51. A method as recited in claim 45,
   wherein said retrieving of the uniform resource locator related to the identifier retrieves a plurality of uniform resource locators related to the identifier, and
   wherein said linking initially links to a selected remote device corresponding to one of the uniform resource locators related to the identifier.

52. A method as recited in claim 45, wherein said linking to the remote device at the uniform resource locator via the network includes using the identifier as a password to access the remote site.

53. A system coupled to a network and associating remote data with local data included in a recording, comprising:
   a local device located at a first location, including
      an access unit to play the recording for a user of the local device and to access the local data;
      a communication unit, coupled to said access unit, to automatically obtain, upon access to the local data by said access unit, the remote data from the network using at least one uniform resource locator corresponding to the local data; and
      an output unit, coupled to said communication unit at the first location, to output the remote data; and
   a remote computer, coupled to said communication unit via the network and located at a second location remote from the first location, storing at least one database of recording identifiers and uniform resource locators, said communication unit obtaining the at least one uniform resource locator from said remote computer.

54. A system as recited in claim 53, wherein the at least one database stored on said remote computer associates the recording identifiers with uniform resource locators of corresponding World Wide Web pages for a plurality of recordings released by an organization.

55. A system as recited in claim 53, wherein the at least one uniform resource locator corresponds to a World Wide Web page maintained on behalf of at least one person who produced sound for the recording.

56. A system as recited in claim 55,
   wherein the World Wide Web page includes access to tickets for live events at which the at least one person will appear in the future, and
   wherein said system further comprises a processor, coupled to said access, communication, and output units, to execute a browser program and instructions to purchase tickets using the World Wide Web.

57. A system as recited in claim 55, wherein the remote data include an electronic file of digitally encoded audio.

58. At least one computer program stored on a computer-readable medium, embodying a method for delivering content complementary to a recording ready for playback by a local device connected to a network, comprising:
   determining an identifier for the recording;
   retrieving from a remote device via the network a uniform resource locator related to the identifier;
   linking to a remote device via the network, in response to the uniform resource locator; and
   delivering content complementary to the recording from the remote device to the local device via the network.

59. At least one computer program as recited in claim 58, wherein the local device is a computer connected to the remote device via the network, and further comprising:

detecting access to the recording by the computer; and automatically starting a client program within the computer to control the computer when the recording is accessed.

60. At least one computer program as recited in claim 58, further comprising:

collecting use data from the local device, the use data related to at least one of a playback of a portion of the recording, play time of the recording and user demographics; and transferring the use data from the local device to the remote device via the network.

61. At least one computer program as recited in claim 60, further comprising continuing said collecting and transferring of the use data from the local device to the remote device via the network as long as the recording is being played.

62. At least one computer program as recited in claim 58, wherein said retrieving of the uniform resource locator related to the identifier includes searching a local cache for the identifier;

connecting to a remote look-up server to search for the identifier and return at least one uniform resource locator related thereto, when the identifier is not found in the local cache within a predetermined period of time;

storing the at least one uniform resource locator returned from the remote look-up server in the local cache; and providing the at least one uniform resource locator related to the identifier for said linking, when the identifier is found in the local cache and when the at least one uniform resource locator is returned from the remote look-up server.

63. At least one computer program as recited in claim 62, wherein a plurality of uniform resource locators related to the identifier are returned from the remote look-up server, and wherein said linking initially links to a selected remote device corresponding to one of the uniform resource locators related to the identifier.

64. At least one computer program as recited in claim 58, wherein said retrieving of the uniform resource locator related to the identifier retrieves a plurality of uniform resource locators related to the identifier, and wherein said linking initially links to a selected remote device corresponding to one of the uniform resource locators related to the identifier.

65. At least one computer program as recited in claim 58, wherein said linking to the remote device at the uniform resource locator via the network includes using the identifier as a password to access the remote site.

66. At least one computer program as recited in claim 58, further comprising:

prompting for access to the recording; and verifying access to the recording.

67. At least one computer program as recited in claim 58, further comprising:

determining an identifier from information associated with the recording; and comparing the identifier with records in a database maintained on a remote computer coupled to the local device via the network.

68. At least one computer program as recited in claim 58, wherein the data include at least one of an image associated with the recording, animation associated with the recording, and a video associated with the recording.

69. A At least one computer program as recited in claim 68, wherein the recording is an electronic file of digitally encoded audio, and wherein the data include an album cover associated with the electronic file.

70. A method as recited in claim 12, wherein said delivering delivers the content including at least one name of a song on the compact disc.

71. A method as recited in claim 12, wherein the compact disc contains a plurality of tracks, and wherein said delivering delivers the content including at least one title of a corresponding track on the compact disc.

72. A computer system as recited in claim 20, wherein said communication unit obtains the remote data including at least one name of a song included in the recording.

73. A computer system as recited in claim 20, wherein the recording is on a compact disc containing a plurality of tracks, and wherein said communication unit obtains the remote data including at least one title of a corresponding track on the compact disc.

74. At least one computer program as recited in claim 24, wherein said outputting outputs the remote data including at least one name of a song included in the recording.

75. At least one computer program as recited in claim 24, wherein the recording is on a compact disc containing a plurality of tracks, and wherein said outputting outputs the remote data including at least one title of a corresponding track on the compact disc.

76. At least one computer program as recited in claim 26, wherein said delivering delivers the content including at least one name of a song on the compact disc.

77. At least one computer program as recited in claim 26, wherein the compact disc contains a plurality of tracks, and wherein said delivering delivers the content including at least one title of a corresponding track on the compact disc.

78. At least one computer program as recited in claim 30, wherein said delivering delivers the content including at least one name of a song on the compact disc.

79. At least one computer program as recited in claim 30, wherein the compact disc contains a plurality of tracks, and wherein said delivering delivers the content including at least one title of a corresponding track on the compact disc.

\* \* \* \* \*